Dec. 9, 1924.
C. H. ROSSMAN
1,518,359
HAND CONTROL MEANS FOR CLUTCH PEDALS
Filed Jan. 7, 1924
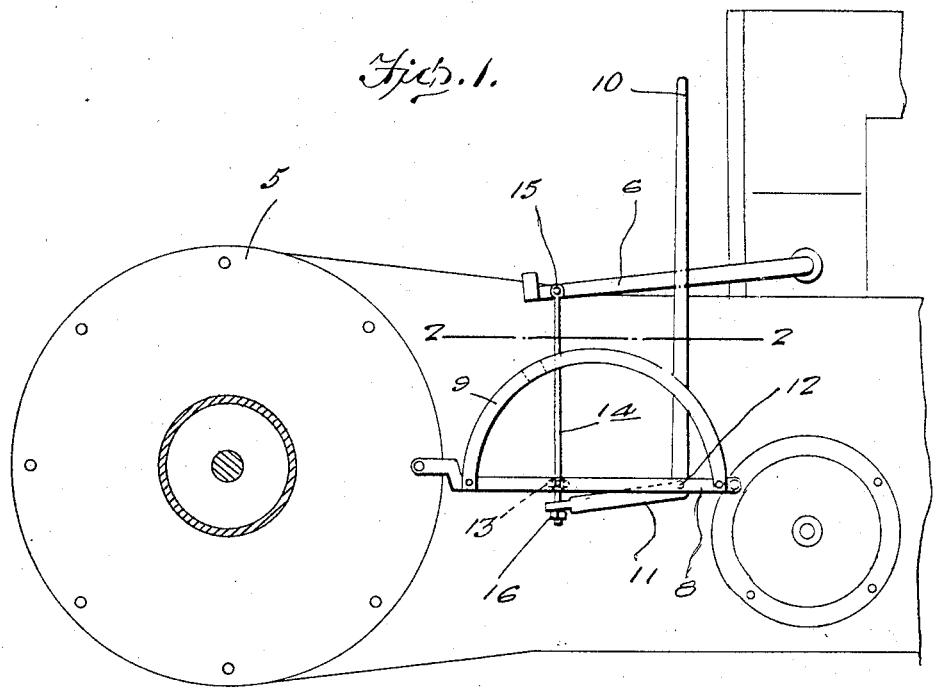
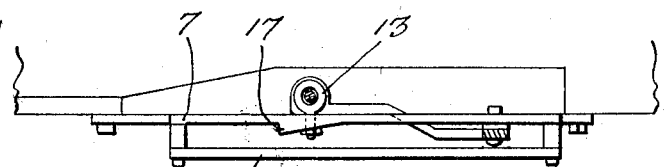
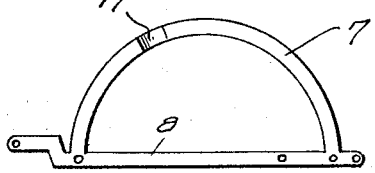
Inventor
C. H. Rossman Patented Dec. 9, 1924.

1,518,359

UNITED STATES PATENT OFFICE.

CHARLES H. ROSSMAN, OF SPRING MILLS, PENNSYLVANIA.

HAND CONTROL MEANS FOR CLUTCH PEDALS.

Application filed January 7, 1924. Serial No. 684,848.

*To all whom it may concern:*

Be it known that I, CHARLES H. ROSSMAN, a citizen of the United States, residing at Spring Mills, in the county of Center and State of Pennsylvania, have invented certain new and useful Improvements in Hand Control Means for Clutch Pedals, of which the following is a specification.

This invention relates to an improvement in hand controls for clutch pedals, and has for its primary object a means that may be readily applied to practically all types of tractors whereby the clutch pedals thereof may be operated by hand, and wherein the clutch pedals may be maintained in a depressed state without requiring the attention of the operator.

An additional object of this invention is to provide a device of the above character that is so constructed as to enable the same to be used in conjunction with practically all types of tractors with which I am now familiar, and wherein the device will operate efficiently under all conditions.

With the foregoing salient objects in view and others that will appear as the nature of the invention will be better understood, the same comprises the novel form, combination and arrangement of parts hereinafter more fully described, shown in the accompanying drawing and claimed.

In the drawing wherein like reference characters indicate corresponding parts throughout the several views, Figure 1 is a fragmentary side elevational view of a conventional form of tractor equipped with my improved hand control means for the clutch pedal thereof, Figure 2 is an enlarged detail longitudinal sectional view taken substantially upon the line 2—2 of Figure 1, for disclosing in top plan the major portion of the present invention, and Figure 3 is a reduced side elevational view of a segment member per se, that comprises an essential part of this invention.

Now having particular reference to the drawing wherein there is shown the application of my improved hand control means for the clutch pedal of a tractor, 5 designates the tractor and 6 the usual foot operated clutch actuating pedal thereof.

My invention per se embodies the provision of a segment 7 that is formed at its lower end with a cross bar 8, the ends of which extend beyond the ends of the segment and are rigidly secured in any manner desirable to the tractor 5 at a point directly beneath the clutch pedal 6 thereof.

Secured to this first mentioned segment 7 upon the outer side thereof and in spaced relation thereto is a relatively similarly shaped segment 9 which co-operates with the before mentioned segment 7 for providing a guide for the relatively long arm 10 of a bell crank 11 that is pivotally secured as at 12 to the cross bar 8 of the segment 7 at a point adjacent its front end.

Carried by said bar 8 of the segment 7 at a point adjacent its other end is a laterally inwardly extending eye-bolt 13 through which is slidably arranged a rod 14 that extends in a vertical direction and is pivoted as at 15 to said clutch pedal 6.

The other arm of this bell crank 11 is so shaped as to extend inwardly of the bar 8 of the segment 7 at its inner end and to have sliding connection as at 16 to the lower end of the rod 14, it being apparent from the foregoing that by pulling rearwardly upon the hand lever portion of said bell crank 11 the clutch pedal 6 will be pulled downwardly for consequently throwing the clutch mechanism of the tractor out of operation.

For maintaining this clutch pedal in a depressed state, the innermost segment 7 is provided upon its side adjacent its co-operating segment 9 with a beveled abutment 17 over which the hand lever part of the bell crank 11 passes and which serves as a means for preventing the return movement of the hand lever 10 unless the same is manually disengaged from behind said abutment 17.

From the foregoing it will at once be apparent to those skilled in the art, that I have provided a highly novel, useful and inexpensive form of hand control means for tractor clutch pedals and one that will, I believe, meet with all of the requirements for a successful commercial use.

Having thus described my invention, what I claim as new and desire to secure by Letters Patent is:—

1. In combination with the clutch pedal of a tractor, a pair of segments rigidly secured in spaced relation to each other, a bar formed upon the lower end of the innermost segment and adapted to be rigidly secured at its opposite ends to the tractor at a point directly beneath the clutch pedal thereof, a bell crank pivotally secured to the bar of said segment one arm of which is arranged vertically for serving as a hand lever, and which is guided between said pair of segments, and an operative connection between the other arm of said bell crank and the tractor clutch pedal.

2. In combination with the clutch pedal of a tractor, a pair of segments rigidly secured in spaced relation to each other, a bar formed upon the lower end of the innermost segment and adapted to be rigidly secured at its opposite ends to the tractor at a point directly beneath the clutch pedal thereof, a bell crank pivotally secured to the bar of said segment one arm of which is arranged vertically for serving as a hand lever, and which is guided between said pair of segments, and an operative connection between the other arm of said bell crank and the tractor clutch pedal, said hand lever arm of the bell crank adapted to be drawn rearwardly for thereby throwing down said clutch pedal, and means for maintaining said hand lever in its rearwardly drawn position.

In testimony whereof I affix my signature.

CHARLES H. ROSSMAN.